United States Patent [19]

Lemay

[11] 3,940,710

[45] Feb. 24, 1976

[54] ARC CONTROLLED DISCHARGE SYSTEM

[75] Inventor: J. Jacques Lemay, Ancienne-Lorette, Canada

[73] Assignee: The Minister of National Defence of Her Majesty's Canadian Government, Ottawa, Canada

[22] Filed: June 20, 1973

[21] Appl. No.: 371,729

[30] Foreign Application Priority Data
Jan. 15, 1973 Canada .................................. 161285

[52] U.S. Cl. ....... 331/94.5 PE; 331/94.5 G; 330/4.3; 313/198
[51] Int. Cl.² ...................... H01S 3/22; H01S 3/097
[58] Field of Search ............... 313/1, 188, 197, 198; 331/94.5; 330/4.3

[56] References Cited
UNITED STATES PATENTS
2,593,486  4/1952  Reeves ............................... 313/1 X OTHER PUBLICATIONS
Morrison et al., Physics Letters, Vol. 40A, No. 5, pp. 375–377 (Aug. 14, 1972).
Nichols et al., IEEE J. Quantum Electronics, Vol. QE-8, No. 8, Aug. 1972, pp. 718–719.
Otis, Rev. of Sci. Instrum., 43, (11) Nov. 1972, pp. 1621–1623.

*Primary Examiner*—Robert J. Webster
*Attorney, Agent, or Firm*—Cushman, Darby & Cushman

[57] ABSTRACT

In the present application there is disclosed an improvement in the operation of transverse energization systems for atmospheric pressure $CO_2$ lasers using a plasma forming plate in which a subsidiary or auxiliary spark gap is provided between one end of the cathode bus bar and the plasma forming plate. Most of the current for the main discharge thus passes through this subsidiary spark gap, and small glow discharges rather than arcs occur between the tips of the cathode pins and the edges of the holes in the plasma forming plate. The use of elongated slots in the plasma forming plate and the use of a mesh in place of the discrete slots is also disclosed. The results of experiments conducted utilizing apparatus of the prior art and of the present invention are also included.

19 Claims, 5 Drawing Figures

ARC CONTROLLED DISCHARGE SYSTEM

The present invention relates to an improvement in the operation of transversely energized, atmospheric pressure, carbon dioxide (TEA-$CO_2$) lasers. In such TEA-$CO_2$ lasers, the energization is in the form of applied electrical pulses of a high voltage and high current nature and extremely short duration — for example, shorter than one microsecond. In TEA-$CO_2$ gas lasers, there is a continuing requirement to obtain a uniform homogeneous high energy electrical discharge in the gas mixture with the discharge being reproducible and reliable from one pulse to the next.

The present invention is directed toward improvements in the operation of transversely excited atmospheric gas lasers of the sort disclosed in prior Hyne Canadian Application Ser. No. 122,687 filed Sept. 13, 1971, now Canadian Patent No. 907,114. This prior Canadian patent represents the state of the art at the time that the present invention was made. The present invention is directed toward an improvement in the apparatus disclosed and claimed in the said prior application. In the Hyne patent there is a discussion of other electrode structures utilized in atmospheric pressure carbon dioxide lasers of the transverse excitation form, and reference is made to Canadian Application Ser. No. 017,844 filed Apr. 19, 1968, in the name of Jacques Beaulieu, now Canadian Patent No. 898,874 issued Apr. 25, 1972, and to Application Ser. No. 060,715, Albert Laflamme et al., and Ser. No. 060,716, Martin Hale et al., both filed Aug. 29th, 1969, which respectively issued on Apr. 11, 1972 as Canadian Patent 897,754 and on May 29, 1973 as Canadian Patent 927,465.

As discussed in the prior Hyne patent, it is necessary for proper operation that the discharge between the cathode pins and the anode be a uniform or diffuse discharge and not a bright arc discharge. A bright arc discharge is characterized by a concentration of charge carriers at one or more locations in the laser cavity through which substantially all of the electric discharge occurs and is further characterized by a bright electrical discharge between the anode and the cathode. A shower discharge which is sometimes present consists of a plurality of fine visible discharge threads of arc. When a bright arc or similar discharge occurs, the gas in the laser cavity is not pumped efficiently. A shower discharge is also less efficient for pumping the laser than a diffused discharge but more efficient than a bright arc. As discussed in the aforesaid application, when a diffuse or plasma discharge occurs, a broad area of discharge or glow is seen with no bright filaments in the discharge, and high efficiency pumping which results in a substantially complete population inversion of the laser gas is obtained. Such pumping results in a strong laser output pulse. For further details of the state of the art prior to the present invention, reference may be had to the applications and patents aforesaid.

One problem with the apparatus as disclosed by Beaulieu is that the excitation or pumping of the laser gas occurs only in columns of excited plasma under each pin or resistive terminal. The so-called double discharge laser is only suitable for low current densities. The invention of Hyne relies on arcs between each pin and the plasma forming plate, and it is consequently very difficult to arrange equal arcs at all pin-hole combinations and the excitation is therefore not uniform. Also the existence of many arcs has an adverse effect on the gas mixture, for example, dissociation of the gas.

The limitation of the Hyne apparatus with respect to uniform excitation has been overcome in the present invention by the addition of a subsidiary or auxiliary spark gap between the cathode bus bar and the plasma forming plate. The auxiliary gap is placed much closer than the other pins, and the main current is consequently carried by the auxiliary gap. Preferably such subsidiary spark gap is located at one end of the cathode bus bar. Utilizing this configuration most of the current in the main discharge passes from the cathode connection to the plasma forming plate through an arc between the electrodes of this single spark gap. Small glow discharges rather than arcs occur between the tips of the cathode pins and the edges of the holes in the plasma forming plate, because only a small proportion of the total current takes this route. The main discharge between the plasma forming plate and the anode is more uniform and more reliable when this addition is made. The output power of the laser pulses is more constant and the number of dropouts or failures of lasing action is greatly reduced.

In accordance with a further feature of the present invention, it is possible to widen the cross-section of the plasma discharge in a direction transverse to the optical axis of the laser by replacing the circular holes shown by Hyne with elongated transverse slots. Each slot has approximately the same area as the hole it replaces and its length is approximately two-thirds of the width of the plasma forming plate. The plasma is widened out to the full width of the slots and a further improvement in the excitation of the laser gas is obtained.

In accordance with a yet further feature of the invention the plasma forming plate may be replaced with a metal screen or mesh, such as copper fly screen, in which case the plasma is widened out to the full width of the plasma forming plate, and still further improvement in operation is obtained.

By provision of the above improvements I have succeeded in obtaining an increased power output from a laser of given size and at the same time have reduced significantly the number of dropouts, thereby improving the stability and reliability of the laser.

In the drawings which illustrate embodiments of the present invention:

Figure 1:
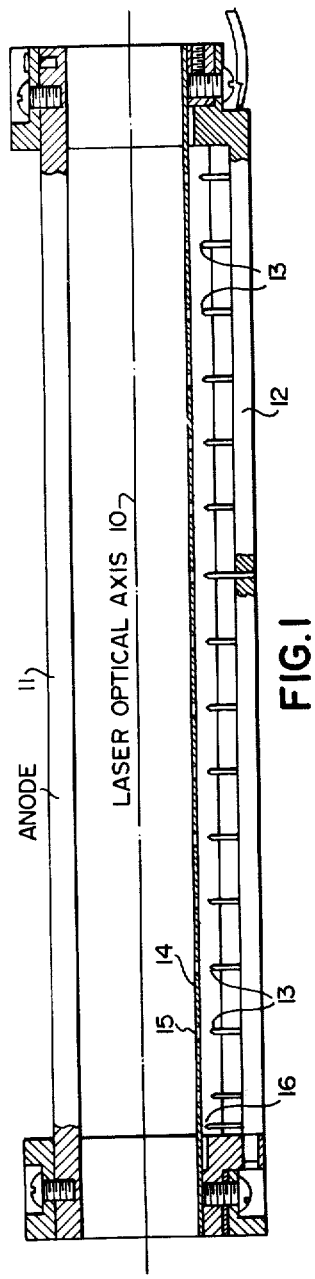
FIG. 1 is a vertical cross-section through a transversely excited atmospheric pressure carbon dioxide gas laser.

Referring to FIG. 1, there is shown a section through a laser apparatus pursuant to the present invention, the electrode structure being constructed about an optical axis 10 and consisting of an anode 11, and a cathode bus bar 12 to which are connected a plurality of discrete cathode pins 13. Positioned between the anode and the cathode bus bar is a plasma forming plate 14 having a plurality of discrete holes 15. In accordance with the present invention, a subsidiary spark gap pin 16 is provided at one end of the cathode bus bar 12 and extends toward the plasma forming plate 14 a greater distance than the remaining pins 13. The spacing of this auxiliary gap depends entirely on parameters used such as electrode geometry, voltage applied and gas mix, and must be pre-adjusted for each combination of these. The pin 16 extends toward the plasma forming plate a sufficient distance to ensure that the initial discharge occurs between the pin 16 and the plate 14, rather than between the pins 13 and the plate 14. Thus as previously mentioned, most of the current in the main discharge path is from the bus bar 12 through the pin 16 to the plasma forming plate 14. At the same time small glow discharges occur between each of the pins 13 and the edges of the holes 15. The main discharge of the laser of course occurs between the plasma forming plate 14 and the anode 11. This main discharge is significantly more uniform and more reliable than with apparatus constructed pursuant to the teachings of Hyne as aforesaid. The output of the laser is more uniform from pulse to pulse, and the number of dropouts is greatly reduced, as will be discussed in detail below.

Figure 2:
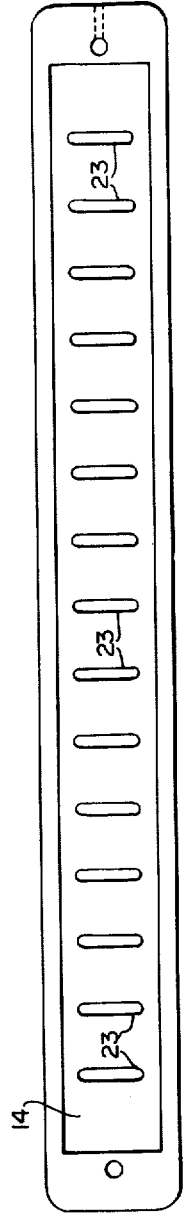
FIG. 2 is a plan view of one form of plasma forming plate pursuant to the present invention.

Referring to FIG. 2 there is shown a plasma forming plate 14 provided with a plurality of elongated slots 23, each of the slots 23 extending approximately two thirds of the width of the plasma forming plate 14. By the use of the plasma forming plate of FIG. 2, a wider plasma discharge is obtained exciting a greater portion of the active volume of the laser.

Figure 3:
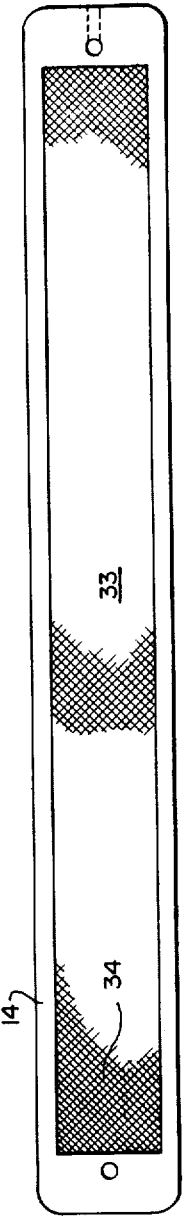
FIG. 3 is a plan view of an alternative form of plasma forming plate pursuant to the present invention.

FIG. 3 illustrates an alternative form of plasma forming plate which is a further improvement over the plate illustrated in FIG. 2. Referring to FIG. 3, there is shown a plate 14 having a single large aperture 33 over which extends a metal mesh or screen 34. The plate 14 comprises a metal frame, and attached to this frame is a copper fly screen 34 mounted flush with the frame surface, and covering the open section in this frame. During operation of the laser pursuant to the present invention using the plasma forming plate of FIG. 3, the plasma is widened out to the full width of the plasma forming plate and further reliability and uniformity of operation is obtained.

With the improved structure as disclosed in the present application, and in particular with the use of an auxiliary spark gap between the cathode and plasma forming plate, the wandering of the arcs among the pin-hole pairs which has been noted with the apparatus of Hyne has been entirely avoided, and the stability of the output pulse is thereby improved. Further, the provision of transverse slots in place of circular holes widens the plasma caused by the electrical discharge, and the utilization of the metal mesh to replace a plurality of discrete slots or holes has resulted in a significant increase in energy and peak power over that of the slotted plasma forming plate.

In order to demonstrate the improvements obtained pursuant to the present invention, apparatus as taught by Hyne was constructed and tested. The subsidiary spark gap of the present invention was then added to the apparatus and a further series of tests were conducted. The elongated slot plasma forming plate of FIG. 2 was then substituted, and further tests were made. Finally the plasma forming plate with the metal screen as per FIG. 3 was installed in the laser, and the tests were repeated.

Figure 4A:
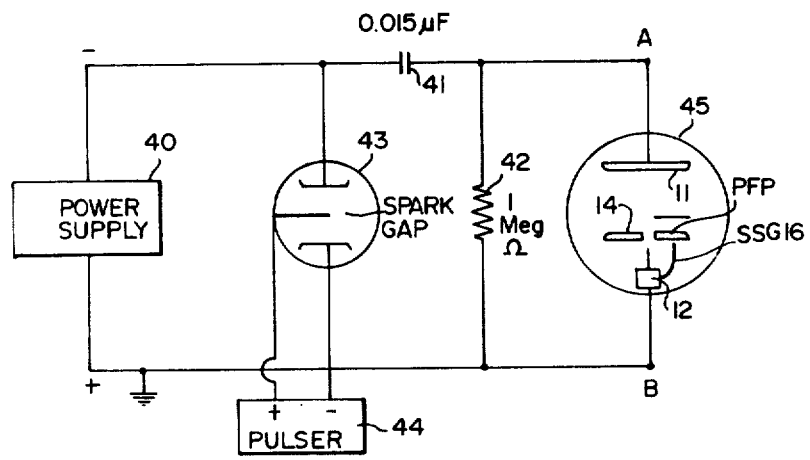
FIGS. 4A and 4B illustrate the electrical connections to the electrode structure pursuant to the present invention.
Figure 4B:
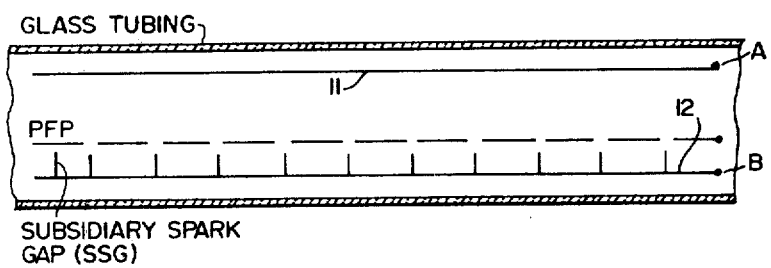

The electrical connections to the apparatus were as illustrated in FIGS. 4A and 4B. A power supply 40 was connected to an electrical capacitor 41, a resistor 42, and a triggered spark gap 43. The spark gap 43 was triggered by a pulser 44, and the laser device 45 was connected between the terminals A and B. The terminal A was connected to the anode 11 of the laser 45 and the terminal B was connected to the cathode bus bar 12 of the laser 45. No connection was made to the plasma forming plate 14. FIG. 4B illustrates schematically a cross-section of the laser under test showing the glass tubing utilized to contain the laser gas and the connection of the anode 11 to the terminal A and the cathode bus bar 12 to the terminal B.

The laser constructed pursuant to the teachings of Hyne was operated and measurements were taken of the output at applied voltages of 35KV and 45KV, the capacitor 41 being 0.005 μfd capacitor. The outputs at 35 and 45KV were 120 and 200 millijoules respectively. A second set of measurements were taken at 35KV and at 38KV to verify the first measurements, and outputs were measured at 125 millijoules and 160 millijoules. At 31KV, one dropout every 30 pulses was recorded at a pulse repetition rate of 3 pulses per minute, and the energy of the output pulse was 90 millijoules. At higher voltages the dropout rate was considerably higher. By substituting a 0.008 μfd capacitor for the 0.005 μfd capacitor 41, an output energy of 250 millijoules maximum was obtained, but the discharge was very unstable. With a 0.01 μfd capacitor, the discharge was worse and the maximum energy was 200 millijoules. The maximum peak power that could be obtained at any time was 1.1 megawatts.

Upon adding the subsidiary spark gap, and no other change; over a voltage range from 31 to 42KV and a pulse repetition rate of 3 pulses per minute, a stability of over 90 percent was obtained — i.e. 16 dropouts in 172 pulses. A short-term stability of 98 percent, one dropout in 47 pulses, was obtained with a 0.01 μfd condenser. At 48KV, an energy of 420 millijoules was measured in the output beam of the laser with a 0.01 μfd condenser and 500 millijoules with a 0.02 μfd condenser. For a 0.01 μfd condenser the peak power was 750 kilowatts at 38KV and 1.1 megawatts at 40KV.

Upon replacing the plasma forming plate with the plate as illustrated in FIG. 2, keeping the same 0.01 μfd condenser and the voltage at 34KV, the output energy was measured at 250 millijoules. No dropouts occurred in 240 pulses over a period of 2 hours, whereupon the experiment was terminated. The energy increased to 300 millijoules at 38KV and the peak power was 1.3 megawatts. On increasing the voltage to 54KV and using a condenser of 0.015 μfd output energy in the laser beam of 1.2 joules was recorded and a peak power of 6 megawatts.

The plate of FIG. 2 was then replaced with the plasma forming plate including the mesh illustrated in FIG. 3. The plasma was more even and the discharge more stable. Details of the measurements taken are summarized below in the following Table:

TABLE I

| Voltage kV | Cond. μfd | Energy mJ | Peak Power | Stability % | Holes diameter | TYPE OF P.F.P. Pitch Inch | Slots width | MESH | Efficiency % |
|---|---|---|---|---|---|---|---|---|---|
| 34.9 | 0.01 | 150 | 200kW | 95 | 0.052 | ½ | — | — | 1.26 |

TABLE I-continued

| Voltage kV | Cond. μfd | Energy mJ | Peak Power | Stability % | Holes diameter | TYPE OF P.F.P. Pitch Inch | Slots width | MESH | Efficiency % |
|---|---|---|---|---|---|---|---|---|---|
| " | " | " | 190kW | 90 to 95 | " | ⅜ | — | — | 1.26 |
| " | " | 115 | 125kW | " | " | ¾ | — | — | 0.965 |
| " | " | 225 | 850kW | " | 0.120 | ½ | — | — | 1.89 |
| " | " | " | 1MW | 80 | " | ⅜ | — | — | 1.89 |
| " | " | " | 750kW | " | — | ½ | 0.94 | — | 1.89 |
| " | " | 240 | 900kW | 100 | — | ½ | 0.065 | — | 2.1 |
| 38 | " | — | 2.37kW | — | — | ½ | " | — | — |
| 54 | 0.015 | 1200 | — | 50 | — | ½ | " | — | 4.1 |
| 42 | " | 500 – 600 | 4.6 MW | — | — | — | — | METAL SCREEN | 3.4 |

I claim:

1. In an excitation system for a transversely excited atmospheric pressure carbon dioxide gas laser of the type having an optical resonator with an optical axis, an anode positioned on one side of the optical axis of said laser and extending therealong, and a plasma forming plate and a cathode positioned on the opposite side of the optical axis and extending therealong, said cathode including a plurality of cathode pins extending toward said plasma forming plate, there being a hole in said plasma forming plate adjacent each of said cathode pins, the improvement comprising providing on said cathode a subsidiary spark gap pin, preferably at one end of said cathode, said spark gap pin extending toward said plasma forming plate sufficiently further than said cathode pins for forming an initial electric spark discharge between said cathode and said plasma forming plate between said spark gap pin and said plate for carrying most of the discharge current between said cathode and said plate and for preventing arc discharges from forming between said cathode pins and plate.

2. In apparatus as defined in claim 1, the further improvement comprising forming said holes in said plate as elongated slots extending transversely to said plate.

3. In apparatus as defined in claim 1, the further improvement comprising forming the major portion of said plate as a metallic mesh.

4. In an excitation system for a transversely excited atmospheric pressure carbon dioxide gas laser of the type having an optical resonator with an optical axis, an anode positioned on one side of the optical axis of said laser and extending therealong, and a plasma forming plate and a cathode positioned on the opposite side of the optical axis and extending therealong, said cathode including a plurality of cathode pins extending toward said plasma forming plate, there being a hole in said plasma forming plate adjacent each of said cathode pins, the improvement comprising said cathode having a subsidiary spark gap pin extending toward said plasma forming plate sufficiently further than said cathode pins for forming an initial electric arc discharge between said spark gap pin and said plate for carrying most of the main discharge current between said cathode and said plasma forming plate for causing only small glow discharges rather than arcs between said cathode pins and said plasma forming plate to increase the uniformity and reliability of the main discharge between said plasma forming plate and anode.

5. The apparatus defined in claim 4 wherein said subsidiary spark gap is positioned at one end of said cathode.

6. In apparatus as defined in claim 4, the further improvement comprising forming said holes in said plate as elongated slots extending transversely to said plate.

7. In apparatus as defined in claim 4, the further improvement comprising forming the major portion of said plate as a metallic mesh.

8. In an excitation system for a transversely excited atmospheric pressure carbon dioxide gas laser of the type having an optical resonator with an optical axis, an anode positioned on one side of the optical axis of said laser and extending therealong, and a plasma forming plate and a cathode positioned on the opposite side of the optical axis and extending therealong, said cathode including a plurality of cathode pins extending toward said plasma forming plate, there being a hole in said plasma forming plate adjacent each of said cathode pins, the improvement comprising providing a subsidiary spark gap between said cathode and said plasma forming plate, said subsidiary spark gap having a breakdown voltage less than the breakdown voltage between said cathode pins and said plasma forming plate for forming an initial electrical discharge between said cathode and said plasma forming plate at said subsidiary spark gap for carrying most of the main discharge current from said cathode to said plate through said gap as an arc while preventing arcs but causing small glow discharges from said cathode pins to said plate to increase the uniformity and reliability of the main discharge from said plate to said anode.

9. The apparatus defined in claim 8 wherein said subsidiary spark gap is positioned at one end of said cathode.

10. In apparatus as defined in claim 8, the further improvement comprising forming said holes in said plate as elongated slots extending transversely to said plate.

11. In apparatus as defined in claim 8, the further improvement comprising forming the major portion of said plate as a metallic mesh.

12. In a gas laser having a population inversion region for containing an active laser gas and having a longitudinal axis and means including an electrode structure for the transverse excitation of the laser gas in said region for creating said population inversion, said electrode structure including an anode extending parallel to said longitudinal axis on one side thereof, a plasma forming plate positioned on the opposite side of said longitudinal axis and extending therealong and a cathode bus including plurality of cathode pins extending toward said plasma forming plate and being fully on the opposite side of said plate as said longitudinal axis, there being a hole in said plasma forming plate adjacent each of said cathode pins, the improvement comprising:

a subsidiary spark gap pin extending from said cathode bus toward said plasma forming plate sufficiently further than said cathode pins for forming an initial electric discharge between said spark gap pin and said plate for carrying most of the discharge current between said cathode bus and said plasma forming plate and for preventing arc discharges from forming between said cathode pins and said plasma forming plate.

13. Apparatus as in claim 12 wherein the holes in said plate are elongated slots extending transversely to said plate.

14. Apparatus as in claim 12 wherein the major position of said plate is a metallic mesh.

15. Apparatus as in claim 12 wherein said subsidiary spark gap pin is disposed at one end of said plasma forming plate.

16. In a gas laser having a population inversion region for containing an active laser gas and having a longitudinal axis and means including an electrode structure for the transverse excitation of the laser gas in said region for creating said population inversion, said electrode structure including an anode extending parallel to said longitudinal axis on one side thereof, a plasma forming plate positioned on the opposite side of said longitudinal axis and extending therealong and a cathode including plurality of cathode pins extending toward said plasma forming plate and being fully on the opposite side of said plate as said longitudinal axis, there being a hole in said plasma forming plate adjacent each of said cathode pins, the improvement comprising:

means extending from said cathode toward said plasma forming plate and forming with said plasma forming plate a subsidiary spark gap having a breakdown voltage less than the breakdown voltage between said cathode pins and said plasma forming plate for forming an initial electrical discharge across said subsidiary spark gap for carrying most of the discharge current between said cathode and said plasma forming plate and for preventing arcs from forming, while causing small glow discharges to form, between said cathode pins and said plasma forming plate so as to increase the uniformity and reliability of the main discharge between said plasma forming plate and said anode.

17. The apparatus defined in claim 16 wherein said subsidiary spark gap forming means is disposed at one end of said plasma forming plate on the same side thereof as said cathode pins.

18. Apparatus as in claim 16 wherein said holes in said plate are elongated slots extending transversely to said plate.

19. Apparatus as in claim 16 wherein the major portion of said plate is a metallic mesh.

* * * * *